(12) United States Patent
Norden

(10) Patent No.: US 8,612,662 B2
(45) Date of Patent: Dec. 17, 2013

(54) QUEUE SHARING AND RECONFIGURATION IN PCI EXPRESS LINKS

(75) Inventor: Hahn Vo Norden, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 280 days.

(21) Appl. No.: 12/995,481

(22) PCT Filed: Jun. 1, 2008

(86) PCT No.: PCT/US2008/065460
§ 371 (c)(1),
(2), (4) Date: Dec. 1, 2010

(87) PCT Pub. No.: WO2009/148432
PCT Pub. Date: Dec. 10, 2009

(65) Prior Publication Data
US 2011/0087820 A1 Apr. 14, 2011

(51) Int. Cl.
*G06F 13/36* (2006.01)
(52) U.S. Cl.
USPC ............... 710/310; 710/29; 710/52; 370/229; 370/230
(58) Field of Classification Search
USPC .............................................. 710/29, 310, 52
See application file for complete search history.

(56) References Cited

U.S. PATENT DOCUMENTS

| | | | |
|---|---|---|---|
| 6,353,867 B1 | 3/2002 | Qureshi et al. | |
| 6,760,793 B2 * | 7/2004 | Kelley et al. | 710/52 |
| 6,973,525 B2 | 12/2005 | Dennis et al. | |
| 7,028,116 B2 | 4/2006 | Shah | |
| 7,181,578 B1 | 2/2007 | Guha et al. | |
| 7,194,271 B2 | 3/2007 | Golestani et al. | |
| 7,218,638 B2 | 5/2007 | Moll | |
| 7,362,705 B2 * | 4/2008 | Beukema et al. | 370/230 |
| 7,536,473 B2 * | 5/2009 | Ajanovic et al. | 709/234 |
| 7,562,168 B1 * | 7/2009 | Yifrach et al. | 710/52 |
| 7,650,443 B1 * | 1/2010 | Cavanagh et al. | 710/52 |
| 7,660,917 B2 * | 2/2010 | Freking et al. | 710/36 |
| 7,694,049 B2 * | 4/2010 | Goh et al. | 710/107 |
| 8,270,295 B2 * | 9/2012 | Kendall et al. | 370/230 |
| 2008/0117931 A1 * | 5/2008 | Beukema et al. | 370/468 |

FOREIGN PATENT DOCUMENTS

| | | |
|---|---|---|
| CN | 1624674 A | 6/2005 |
| EP | 1041491 A2 | 10/2000 |

OTHER PUBLICATIONS

International Search Report and Written Opinion, dated Feb. 25, 2009, 11 pages.
Chinese Search Report cited in application 200880130649.8 dated Aug. 16, 2013; 2 pages.

* cited by examiner

*Primary Examiner* — Brian Misiura

(57) ABSTRACT

In one embodiment an electronic device comprises at least one processor, at least one PCI express link, a virtual channel/sub-link flow control module, and a memory module communicatively connected to the one or more processors and comprising logic instructions which, when executed on the one or more processors configure the one or more processors to determine, in an electrical device, whether a virtual channel/sub-link is inactive, and in response to a determination that at least one virtual channel/sub-link is inactive, reallocate queue space from the at least one inactive channel to at least one active channel.

3 Claims, 5 Drawing Sheets

QUEUE SHARING AND RECONFIGURATION IN PCI EXPRESS LINKS

BACKGROUND

In many computer environments, a fast and flexible interconnect system can be desirable to provide connectivity to devices capable of high levels of data throughput. In the fields of data transfer between devices in a computing environment, PCI Express (PCI-E) can be used to provide connectivity between a host and one or more client devices or endpoints.

Many high-speed links, such as PCI Express, support multiple virtual channels for multiple traffic classes and multiple divisions of "fat" link into multiple sub-links to support multiple end devices. If a virtual channel, or sub-link, is not active, memory associated with an inactive channel is also unused.

DETAILED DESCRIPTION

Generally, many high-speed links, such as PCI Express, support multiple virtual channels for multiple traffic classes. Each traffic type may require its own resources for each type of transaction, such as but not limited to: Posted/none-posted/completion, Non-Posted/none-posted/completion and Completion. Traditionally, a PCI Express device may have separate and fixed queues for each traffic type and each virtual channel. If a virtual channel/sub-link is not active, then unused queues may be wasted. Described herein are methods and apparatus to reconfigure and reallocate memory queues from inactive channels to active channels to optimize performance across a PCI express link.

Figure 1:
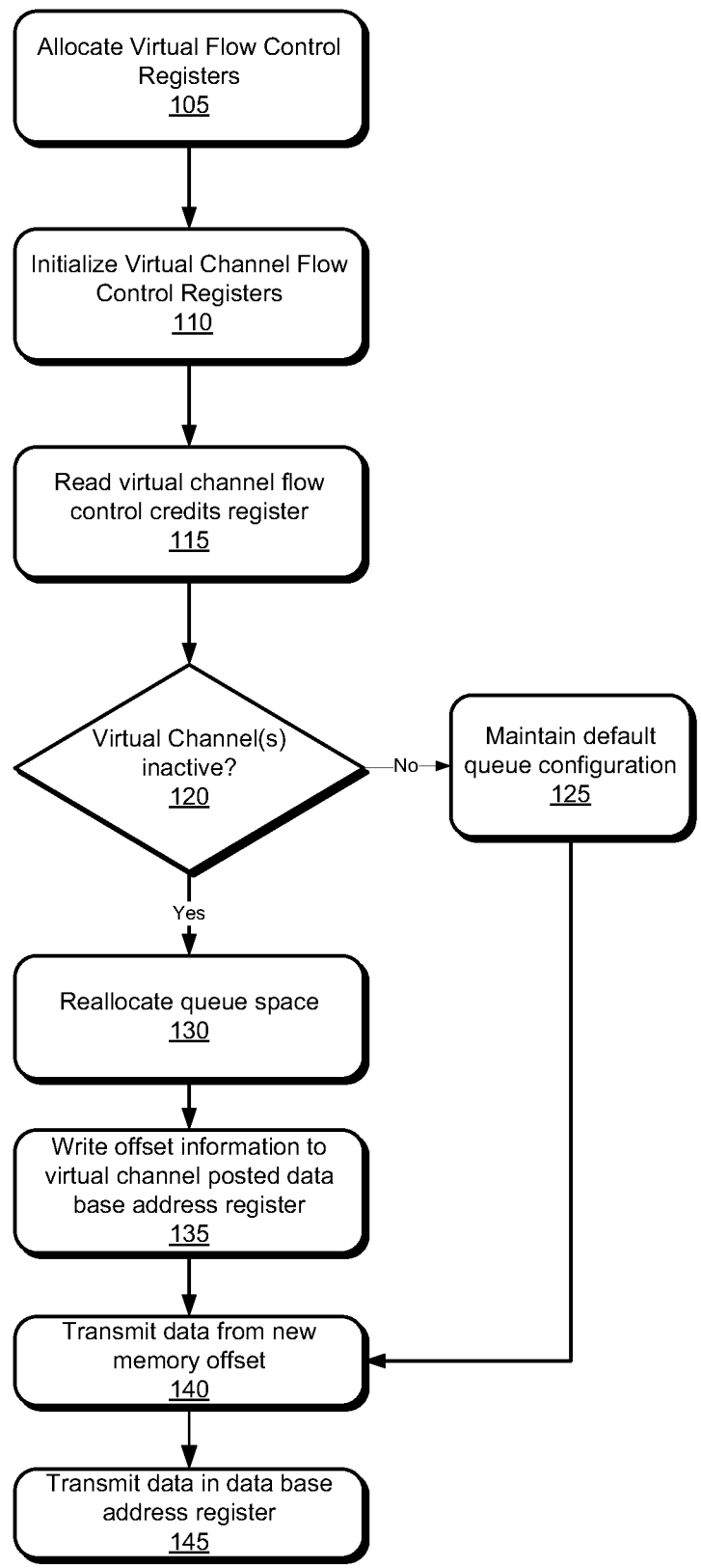
FIG. 1 is a flowchart illustrating operations implementing a virtual channel/sub-link flow control module, according to embodiments.

FIG. 1 is a flowchart illustrating operations implementing a virtual channel/sub-link flow control module, according to embodiments. Referring to FIG. 1, at operation 105, virtual channel/sub-link flow control credits are allocated. In some embodiments, these virtual channel/sub-link flow control credits are referenced in a virtual channel/sub-link flow control register. In some embodiments, the allocation may take place as part of power-on self-test (POST). In some embodiments, non-zero values with numbers indicating a queue size may be used for active channels, while zeros may be used for inactive channels.

During usage of a computer system, electronic device or the like, a virtual channel/sub-link flow control module may reallocate queue space from inactive channels to active channels. At operation 110, virtual channel/sub-link flow control registers are initialized. At operation 115, the virtual channel/sub-link flow control credits register is read to determine the status of virtual channels. If at operation 120, all the virtual channels are in use then at operation 125 the queue configuration for virtual channels may remain in a default state, and data may be transmitted across a PCI express link through virtual channels at operation 140.

By contrast, if at operation 120, it is determined that at least one virtual channel/sub-link is inactive, then at operation 130 the memory queue allocated to the inactive channels may be reallocated to active channels. In operation, inactive memory queue may be reallocated in any number of ways. The reallocation does not need to be equal among active channels.

At operation 135, offset information may be written to a virtual channel/sub-link's posted/none-posted/completion data base address register. At operation 140 data may be transmitted across a PCI express link through virtual channels. Finally, at operation 145 data is transmitted from reconfigured offset information in the virtual channel/sub-link's posted/none-posted/completion data base address register.

Figure 2:
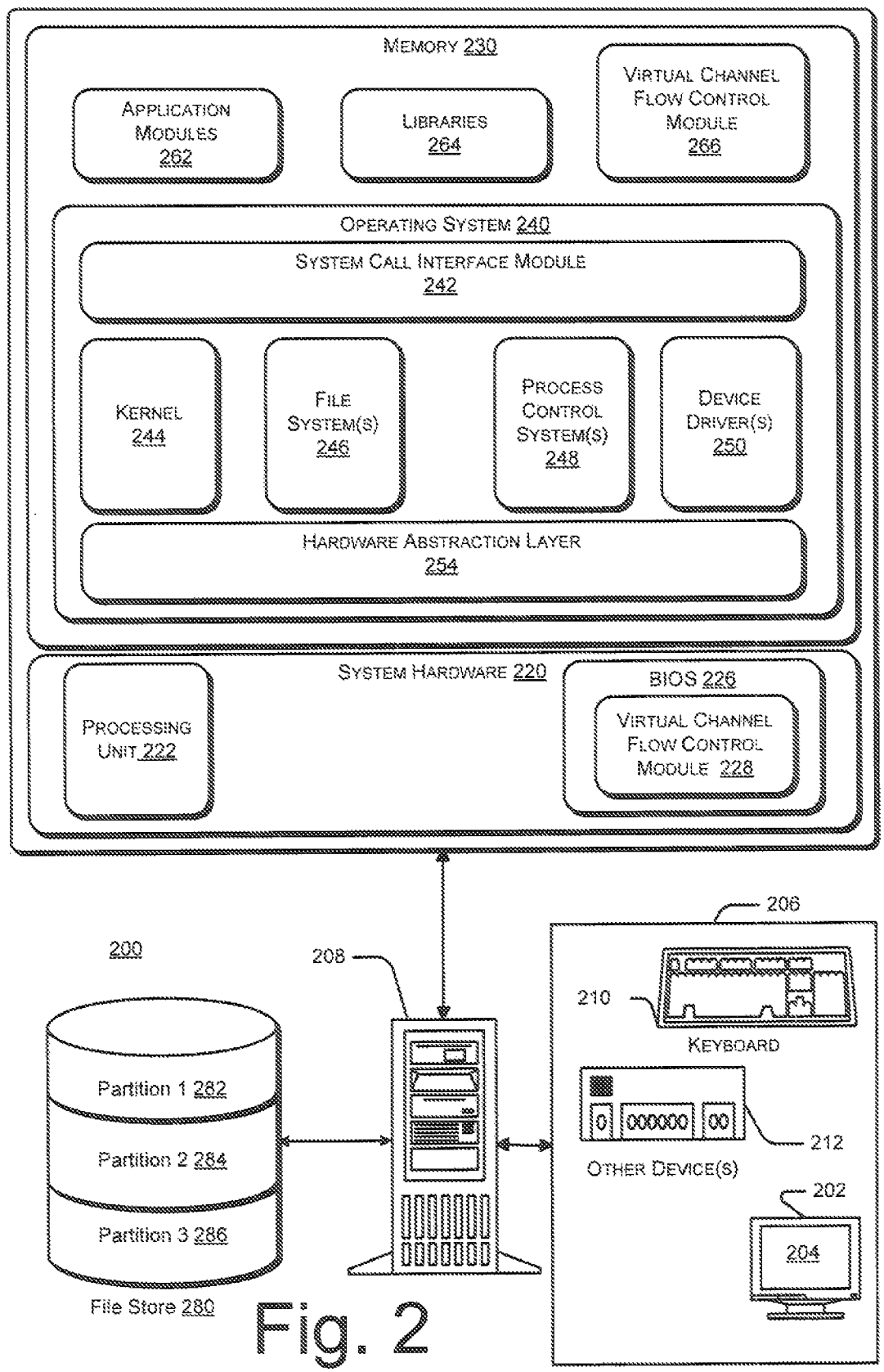
FIG. 2 is a schematic illustration of a computing system adapted to incorporate a virtual channel/sub-link flow control module, according to embodiments.

FIG. 2 is a schematic illustration of a computing system 200 adapted to include a virtual channel/sub-link flow control module, according to embodiments. The computing system 200 includes a computing engine 208 and possibly one or more accompanying input/output devices 206 including, but not limited to, a display 202 having a screen 204, a keyboard 210, and other I/O device(s) 212. The other device(s) 212 may, by way of example, and not by limitation, include a touch screen, a voice-activated input device, a track ball, a mouse and any other device that allows the system 200 to receive input from a developer and/or a user.

The computing engine 208 includes system hardware 220 commonly implemented on a motherboard and at least one auxiliary circuit board. System hardware 220 includes a processor 222 and a basic input/output system (BIOS) 226. BIOS 226 may be implemented in flash memory and may comprise logic operations to boot the computer device and a power-on self-test (POST) module for performing system initialization and tests. In operation, when activation of computing system 200 begins processor 222 accesses BIOS 226 and shadows the instructions of BIOS 226, such as power-on self-test module, into operating memory. Processor 222 then executes power-on self-test operations to implement POST processing.

Computing system 200 further includes a file store 280 communicatively connected to computing engine 208. File store 280 may be internal such as, e.g., one or more hard drives, or external such as, e.g., one or more external hard drives, network attached storage, or a separate storage network. In some embodiments, the file store 280 may include one or more partitions 282, 284, 286.

Memory 230 includes an operating system 240 for managing operations of computing engine 208. In one embodiment, operating system 240 includes a hardware abstraction layer 254 that provides an interface to system hardware 220. In addition, operating system 240 includes a kernel 244, one or more file systems 246 that manage files used in the operation of computing engine 208 and a process control subsystem 248 that manages processes executing on computing engine 208. Operating system 240 further includes one or more device drivers 250 and a system call interface module 242 that provides an interface between the operating system 240 and one or more application modules 262 and/or libraries 264. The various device drivers 250 interface with and generally control the hardware installed in the computing system 200.

In operation, one or more application modules 262 and/or libraries 264 executing on computing engine 208 make calls to the system call interface module 242 to execute one or more commands on the computer's processor. The system call interface module 242 invokes the services of the file systems 246 to manage the files required by the command(s) and the process control subsystem 248 to manage the process required by the command(s). The file system(s) 246 and the process control subsystem(s) 248, in turn, invoke the services of the hardware abstraction layer 254 to interface with the system hardware 220. The operating system kernel 244 can be generally considered as one or more software modules that are responsible for performing many operating system functions.

The particular embodiment of operating system 240 is not critical to the subject matter described herein. Operating system 240 may, for example, be embodied as a UNIX operating system or any derivative thereof (e.g., Linux, Solaris, etc.) or as a Windows® brand operating system or another operating system.

In some embodiments, computing system 200 includes at least one virtual channel/sub-link flow control module 228, 266, which may comprise operational logic and may include or invoke hardware that can communicate with at least one remote device or component. In the embodiment depicted in FIG. 2, BIOS 226 includes a virtual channel/sub-link flow control module 228 and system memory 230 includes a virtual channel/sub-link flow control module 266.

Virtual channel/sub-link flow control module 228, 266 may determine whether each of n virtual channels is active or inactive and may write that information to a virtual channel/sub-link flow control credits register. The virtual channel/sub-link flow control module 228, 266 may then read the virtual channel/sub-link flow control credits register to determine if any virtual channels are inactive and may reallocate memory queue space in the memory 230 from the inactive channels to active channels. After reconfiguring the queues, the virtual channel/sub-link flow control module 228, 266 may write new memory offset of the channels' queue region into its virtual channel/sub-link's posted/none-posted/completion base address register. Operations implemented by the virtual channel/sub-link flow control modules 228, 266 will be discussed in greater detail below, with reference to FIGS. 3 and 4.

Figure 3:
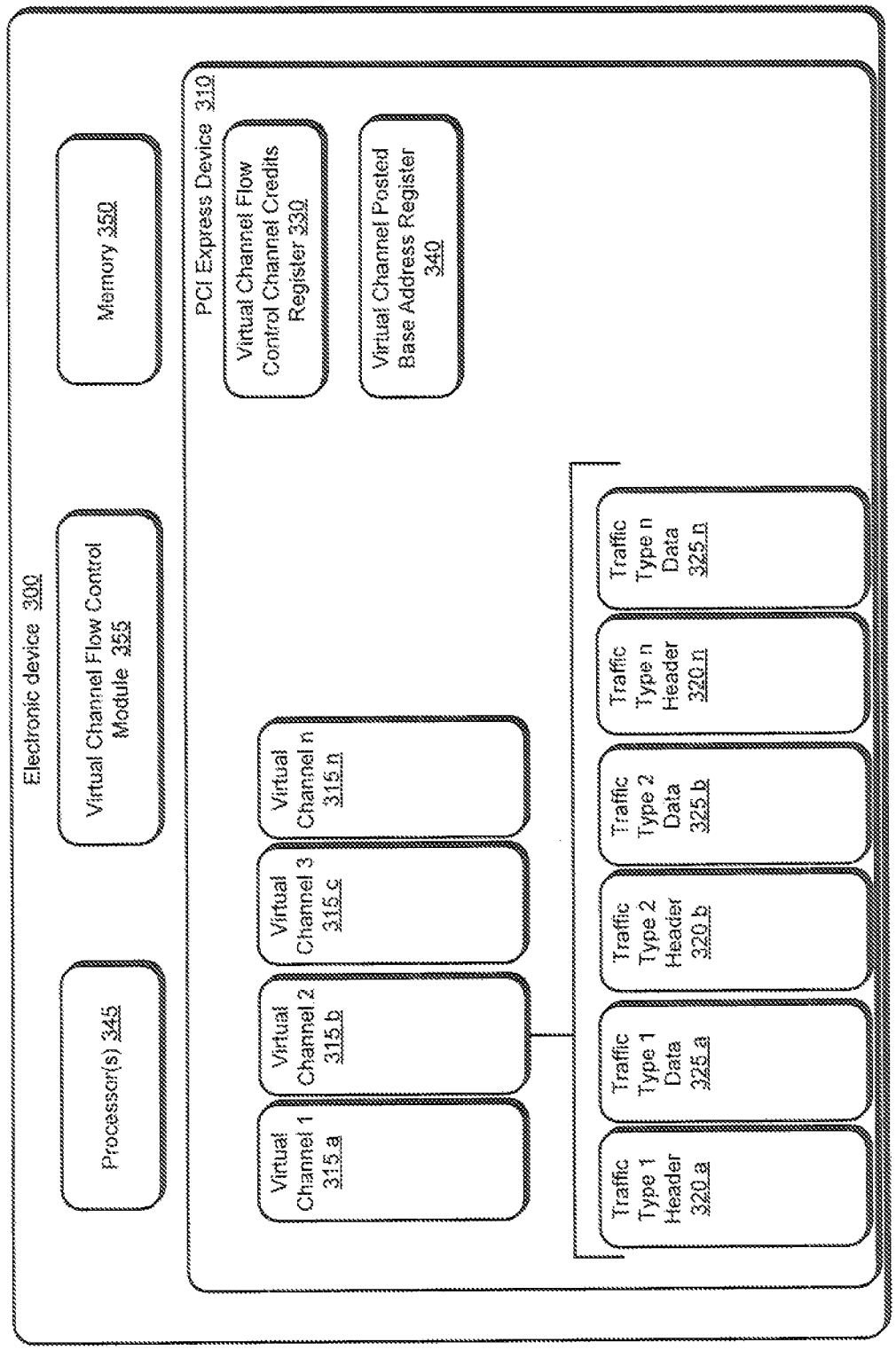
FIG. 3 is a schematic illustration of an electronic device adapted to incorporate a virtual channel/sub-link flow control module, according to embodiments.

FIG. 3 is a schematic illustration of an electronic device 300 adapted to incorporate a virtual channel/sub-link flow control module, according to embodiments. Referring to FIG. 3, electronic device 300 may comprise, among other components, at least one PCI express device 310, at least one processor 345, at least one memory module 350 and a virtual channel/sub-link flow control module 355. In some embodiments, memory 350 may provide a storage location for data to be queued before transmission or after data is received. In some embodiments, to optimize performance, a quad/oct-port RAM memory may be used so as to allow all channels to access their region of memory/queue concurrently and independently.

PCI Express device 310 may comprise at least one virtual channel/sub-link 315a, 315b, 315c, and 315n for data communication across a PCI express link. As depicted in FIG. 3, n virtual channels are represented as virtual channel/sub-link 1, virtual channel/sub-link 2 to virtual channel/sub-link n. In some embodiments, each virtual channel/sub-link may comprise n number of traffic types. Furthermore, each traffic type may comprise header information 320a, 320b, 320n and data 325a, 325b, 325n.

In some embodiments, a virtual channel/sub-link flow control module 355 may be initialized to analyze the virtual channels 315a, 315b, 315c, and 315n. Virtual channel/sub-link flow control module 355 determines flow control credits for each type of traffic type for each virtual channel/sub-link and writes the flow control credits to a virtual channel/sub-link flow control credit register 330. By way of example and not limitation, an inactive channel may have values of zero, while active channels may have non-zero values with the numbers indicating the size of the active channels' queue.

In some embodiments, a virtual channel/sub-link flow control module 330 may read the virtual channel/sub-link flow control credit register 330 to determine if there are inactive channels, and then reallocate the memory queue from the inactive virtual channels 315a, 315b, 315c, and 315n to active virtual channels 315a, 315b, 315c, and 315n. In some embodiments, after reconfiguring queues, the virtual channel/sub-link flow control module 330 may write offset of the channels' queue region into its virtual channel/sub-link Posted/none-posted/completion Base Address Register 340.

Figure 5:
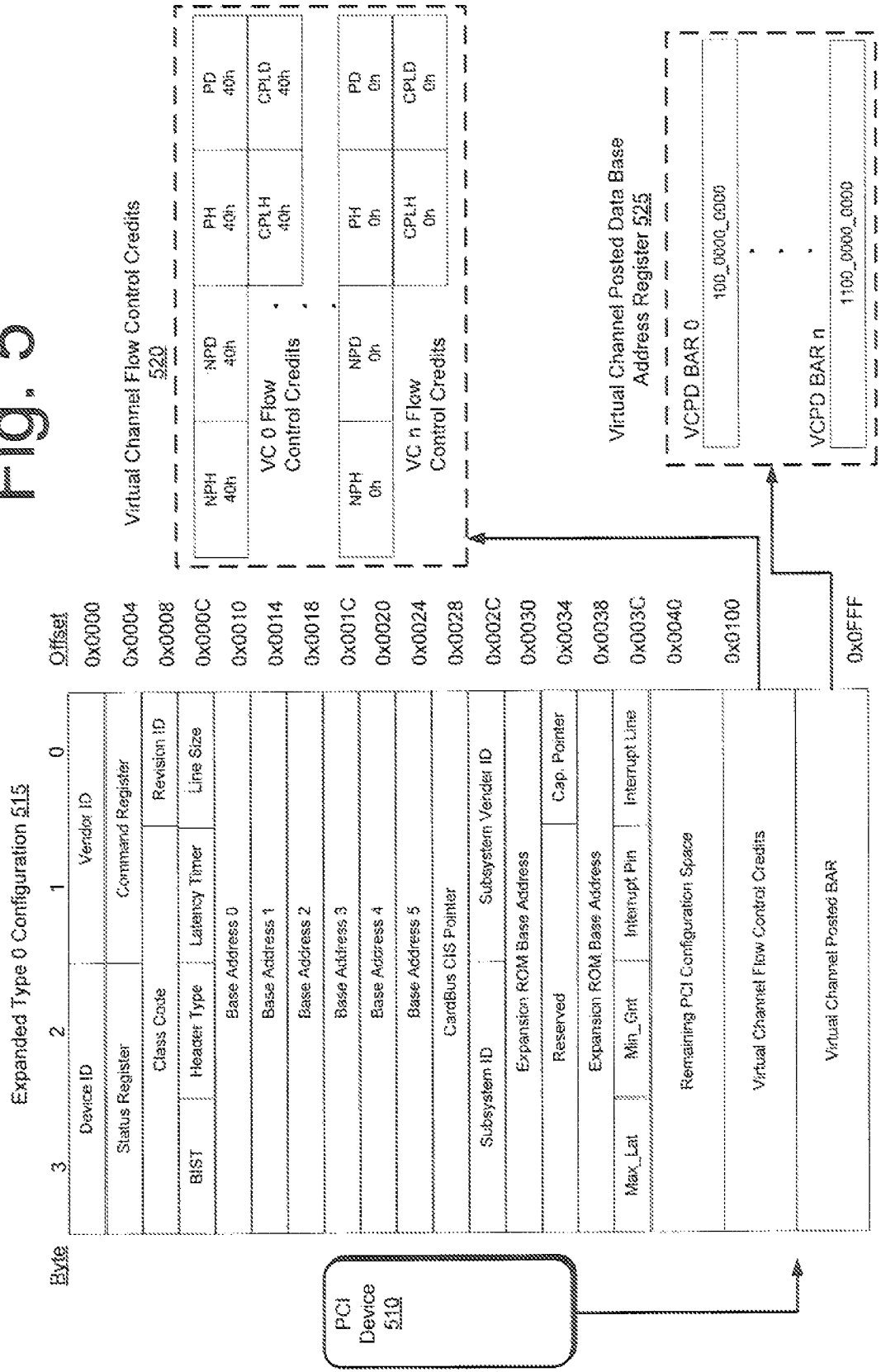
FIG. 5 is a schematic illustration of one embodiment in which queue sharing and reconfiguring in a point-to-point link may be implemented.

In operation, a PCI express device 310 in an electronic device 300 may be capable of supporting a number (n) of virtual channels represented in FIG. 3 by reference numerals 315a, 315b, 315c, and 315n. A virtual channel/sub-link flow control module 355 may determine whether each of n virtual channels is active or inactive and writes that information to a virtual channel/sub-link flow control credits register 330. An example of the Type 0 configuration space header in which virtual channel/sub-link flow control credits may be placed is shown in FIG. 5. The virtual channel/sub-link flow control module 355 then reads the virtual channel/sub-link flow control credits register 330 to determine if any virtual channels are inactive and reallocates queue space in the memory 350 from the inactive channels to active channels. After reconfiguring the queues, the virtual channel/sub-link flow control module 355 writes offset of the channels' queue region into its virtual channel/sub-link Posted/none-posted/completion Base Address Register 340. An example of the Type 0 configuration space header in which a virtual channel/sub-link Posted/none-posted/completion Base Address Register 340 may be placed is shown in FIG. 5.

By way of example and not limitation, a PCI express device may have eight virtual channels, with each channel having six registers allocated to it. The six registers may be divided between three traffic types with each traffic type having a register for header information and a register for data.

Figure 4:
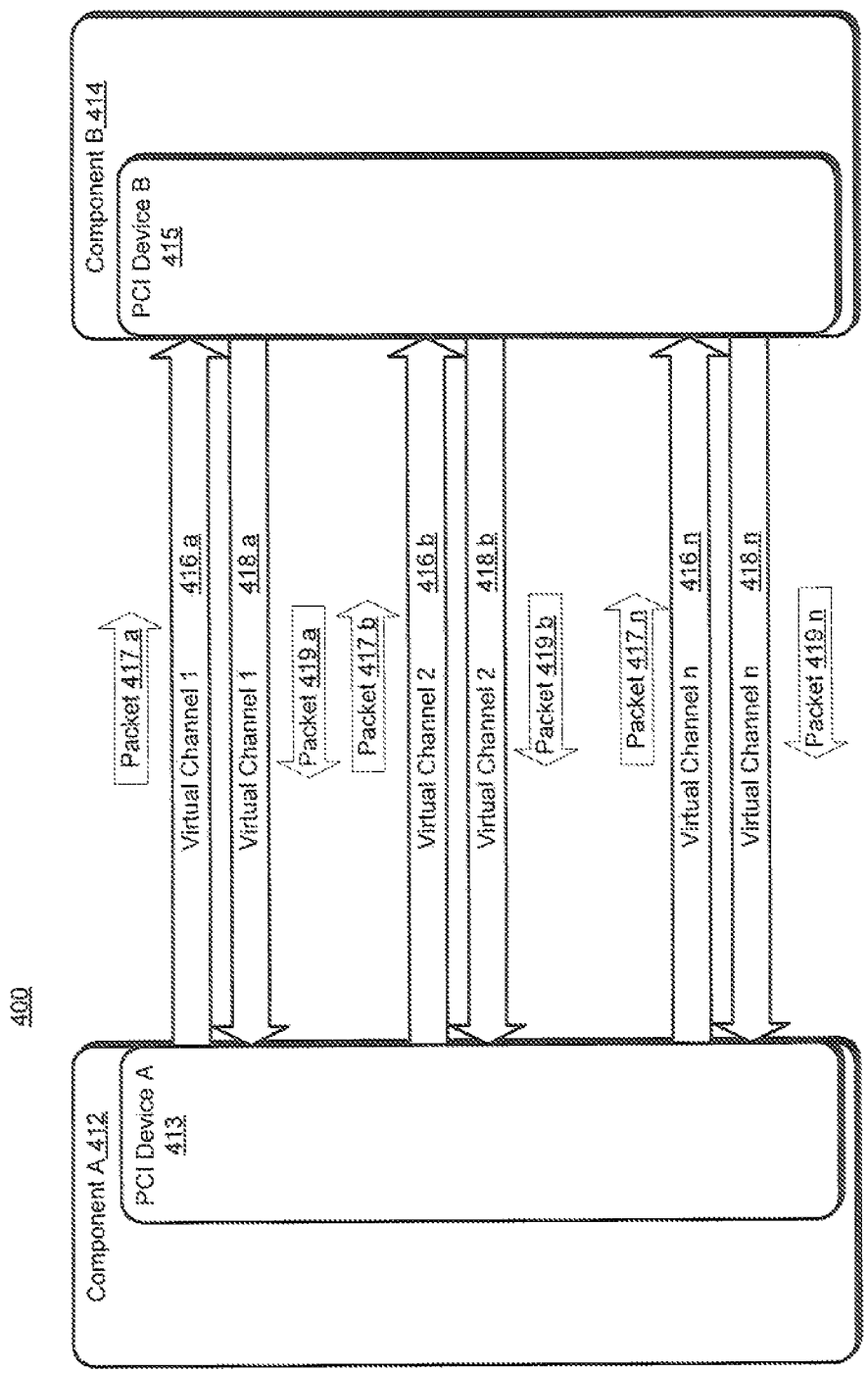
FIG. 4 is a schematic representation of a PCI-Express connection, according to embodiments.

FIG. 4 is a schematic representation of a PCI-Express connection, according to embodiments. The components shown in FIG. 4 are only examples, and are not intended to suggest any limitation as to the scope of the functionality of the current invention; the current invention is not necessarily dependent on the features shown in FIG. 4.

With reference to FIG. 4, there will now be described the basic point-to-point communications channel provided by PCI-Express. A component collection consisting of two ports and the lanes connecting those ports can be referred to as a link. A link represents a dual-simplex communications channel between two components. As shown in FIG. 4, in a simplified form, a link 400 may include components 412 and 414, each including respective transmit and receive PCI device pairs 413 and 415. Two unidirectional, low-voltage, differentially driven channels 416a, 416b, 416n and 418a, 418b, 418n connect each of the ports of the components, one channel in each direction. The channel pair can be referred to as a lane. The channels 416a, 416b, 416n and 418a, 418b, 418n may carry packets 417a, 417b, 417n and 419a, 419b, 419n between the components. In some implementations, each lane provides an effective data transfer rate of 2.5 Gigabits per second per lane in each direction. For circumstances where this data bandwidth is insufficient, to scale bandwidth a link may aggregate multiple Lanes denoted by ×N where N may be any of the supported Link widths. A ×8 Link represents an aggregate bandwidth of 20 Gigabits/second of raw bandwidth in each direction. This base specification 1.0 describes operations for ×1, ×2, ×4, ×8, ×12, ×16, and ×32 Lane widths. In some implementations only symmetrical links may be permitted, such that a link includes the same number of lanes in each direction. For circumstances where this data bandwidth is insufficient, to scale bandwidth Various classes of data may be transmitted across a PCI-express link. By way of example and not limitation, transaction layer packets (TLPs) may be transmitted from one link to another as necessary, subject to the outing mechanisms and rules discussed below. As transactions are carried out between PCI express requesters and completers, four separate address spaces are used: Memory, IO, Configuration, and Message. Accesses to the four address spaces in PCI express may be accomplished using split-transaction requests and completions. In PCI express, the completion following a request may be initiated by the completer when it has data and/or status ready for delivery. The fact that the completion is separated in time from the request which caused it also means that two separate TLPs are generated, with independent routing for the request TLP and the Completion TLP. While a link is free for other activity in the time between a request and its subsequent completion, a split-transaction protocol involves some additional overhead as two complete TLPs must be generated to carry out a single transaction.

To mitigate the penalty of the request-completion latency, messages and some write transactions in PCI express are posted/none-posted/completion, meaning the write request (including data) is sent, and the transaction is over from the requester's perspective as soon as the request is sent out of an egress port. In PCI express, write posting to memory is considered acceptable in exchange for the higher performance. On the other hand, writes to IO and configuration space may change device behavior, and write posting is not permitted. A completion will always be sent to report status of the IO or configuration write operation.

FIG. 5 is a schematic illustration of one embodiment in which queue sharing and reconfiguring in a point-to-point link may be implemented. The components shown in FIG. 5 are only examples, and are not intended to suggest any limitation as to the scope of the functionality of the current invention; the current invention is not necessarily dependent on the features shown in FIG. 5.

With reference to FIG. 5, in some instances, a PCI device 510 may be capable of supporting eight virtual channels. By way of example and not limitation, if one were to assume a PCI device 510 uses 4KB queue for Posted/none-posted/completion traffic, which provides 512 bytes for each virtual channel/sub-link if all eight channels are active. In some embodiments, when flow control initialization is complete, PCI device 510 may read from virtual channel/sub-link flow control registers 515 to determine the virtual channel/sub-link flow control credits 520. In the depicted example, the PCI device may read values of 40 h (64 decimal) for four active virtual channels and zeros for the remaining 4 inactive channels. Thereafter, queue space from the four inactive channels may be reallocated to the four active channels thereby allowing each active channel to have 1024 byte queues, assuming the redistribution is even across the four active channels. After reconfiguring the queues, offset of the channels' queue region may be written to a virtual channel/sub-link posted/none-posted/completion data base address register (VCPD BAR) 525.

As described above, traffic types such as but not limited to post, non-post and completion are used with PCI express links. By way of example and not limitation, Memory Write requests are posted/none-posted/completion. No completion is expected or sent. Configuration Read and Write requests are non-posted/none-posted/completion. A completion without data (Cpl) may be returned by the completer to report status of the configuration space write operation. A completion with data (CplD) may be returned by the completer with requested data and to report status of the read operation.

Thus, described herein are exemplary system and methods for implementing queue sharing and queue optimization in PCI express linked systems. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method for queue sharing in a point to point link comprising:
   determining, in an electrical device, whether a virtual channel/sub-link is inactive; and
   in response to a determination that at least one virtual channel/sub-link is inactive, reallocating queue space from the at least one inactive channel to at least one active channel;
   writing, in an electrical device, offset information of a virtual channels' queue region in a virtual channel/sub-link posted/none-posted/completion data base address register for data to be transmitted across a known number of virtual channels; and
   transmitting data, in an electrical device, across the known number of virtual channels.

2. The method of claim 1, wherein the data is transmitted through a PCI express link.

3. An electronic device comprising:
   at least one processor;
   at least one PCI express link;
   a virtual channel/sub-link flow-control module;
   a memory module communicatively connected to the one or more processors and including logic instructions which, when executed on the one or more processors cause the one or more processors to:
      determine, in an electrical device, whether a virtual channel/virtual channel/sub-link is inactive, and
      in response to a determination that at least one virtual channel/sub-link is inactive, reallocate queue space from the at least one inactive channel to at least one virtual channel;
   logic to write offset information of a virtual channels' queue region in a virtual channel/sub-link posted/none-posted/completion data base address register for data to be transmitted across a known number of virtual channels; and
   logic to transmit data, in an electrical device, across the known number of virtual channels.

* * * * *